United States Patent
Blakesley et al.

(10) Patent No.: US 6,450,534 B1
(45) Date of Patent: Sep. 17, 2002

(54) SEAT BELT TENSION SENSOR

(75) Inventors: Patrick B. Blakesley, Goshen, IN (US); Robert Rainey, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/866,368

(22) Filed: May 25, 2001

(51) Int. Cl.$^7$ .............................................. B60R 22/18
(52) U.S. Cl. ............................. 280/801.1; 73/862.391; 73/862.451
(58) Field of Search ............................. 280/801.1, 735; 73/862.391, 862.451

(56) References Cited

U.S. PATENT DOCUMENTS

| | | | |
|---|---|---|---|
| 5,181,739 A | 1/1993 | Bauer | |
| 5,244,231 A | 9/1993 | Bauer | |
| 5,386,442 A | * 1/1995 | Diaz et al. | ................... 376/245 |
| 5,765,774 A | 6/1998 | Maekawa | |
| 5,959,220 A | * 9/1999 | Jun | ......................... 73/862.391 |
| 5,960,523 A | * 10/1999 | Husby et al. | ................. 24/303 |
| 5,996,421 A | 12/1999 | Husby | |
| 6,081,759 A | 6/2000 | Husby | |
| 6,151,540 A | 11/2000 | Anishetty | |
| 6,161,439 A | 12/2000 | Stanley | |
| 6,205,868 B1 | 3/2001 | Miller | |
| 6,209,915 B1 | 4/2001 | Blakesley | |
| 6,259,042 B1 | * 7/2001 | David | ......................... 177/136 |
| 6,264,236 B1 | 7/2001 | Aoki | |
| 6,311,571 B1 | * 11/2001 | Norton | .................. 73/862.637 |
| 6,336,371 B1 | 1/2002 | O'Boyle | |
| 6,405,607 B2 | * 6/2002 | Faigle et al. | ........... 73/862.381 |
| 2001/0054323 A1 | 12/2001 | Faigle | |

FOREIGN PATENT DOCUMENTS

WO     WO99/12012     3/1999

* cited by examiner

Primary Examiner—Paul N. Dickson
Assistant Examiner—Toan C To
(74) Attorney, Agent, or Firm—Mark P. Bourgeois; Mark W. Borgman

(57) ABSTRACT

A seat belt sensor for attachment to a seat belt in a vehicle. The seat belt tension sensor has a substrate with a top surface, a bottom surface and a pair of slots therethrough. The seat belt passes through the slots. The substrate has a pair of apertures. An actuator bar is located adjacent the top surface and has a first and second end that pass through the apertures. The seat belt passes over the actuator bar. A load beam is attached to the substrate and has a first and second end. The ends of the actuator bar contact the ends of the load beam. Strain sensitive resistors are located on the load beam. The seat belt, when placed in tension, causes the actuator bar ends to flex the ends of the load beam placing stress on the strain sensitive resistor. The strain sensitive resistor generates an electrical in response to being placed under stress.

13 Claims, 6 Drawing Sheets

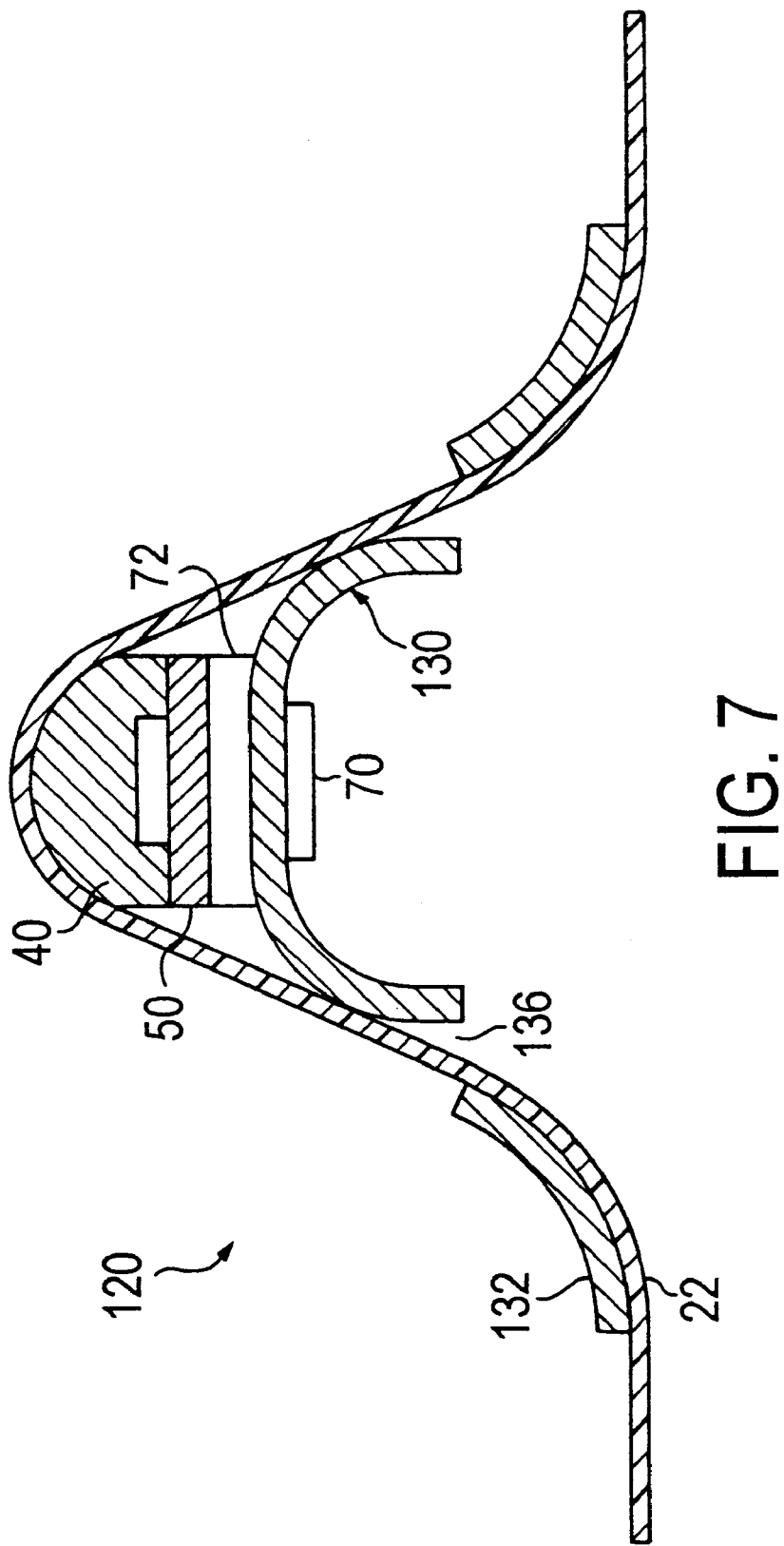

SEAT BELT TENSION SENSOR

BACKGROUND OF THE INVENTION

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance proportional to force which causes dimensional changes of the resistor.

Many types of strain gauge sensors have been designed and made commercially available. Various strain gauge sensors have proven to be generally satisfactory. Prior art sensors, however, have tended to be rather expensive and not suitable in certain applications such as sensing the presence of an occupant in an automobile seat. A sensor suitable for such an application must be compact, robust, impervious to shock and vibration and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation.

Unfortunately there are several problems with detecting seat occupant weight. For example, when a seat occupant puts on a seat belt, the force of cinching down the seat belt on the occupant can cause a seat weight sensor to have false and erroneous readings. In another example, if a child's car seat is cinched down tightly in the car seat, it can appear to the weight sensor that a heavy person is in the seat, which is the wrong reading.

A current unmet need exists for a reliable, low cost, simple and robust seat belt tension sensor that can be used to input additional seat occupant information to an airbag controller to control airbag deployment.

SUMMARY OF THE INVENTION

It is a feature of the invention to provide a reliable and cost-effective vehicle seat belt tension sensor for detecting the magnitude of tension in a seat belt when an occupant is in the seat.

An additional feature of the invention is to provide a seat belt tension sensor for attachment to a seat belt in a vehicle. The seat belt tension sensor includes a substrate having a top surface, a bottom surface and a pair of slots therethrough. The seat belt passes through the slots. The substrate has a pair of apertures. An actuator bar is located adjacent the top surface. The actuator bar has a first and second end. The ends pass through the apertures. The seat belt passes over the actuator bar. A load beam is attached to the substrate. The load beam has a first and second end. The ends of the actuator bar contact the ends of the load beam. At least one strain sensitive resistor is located on the load beam. The seat belt, when placed in tension, causes the actuator bar ends to flex the ends of the load beam placing stress on the strain sensitive resistor. The strain sensitive resistor generates an electrical signal in response to being placed under stress. The electrical signal changes as a function of tension on the seat belt.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 7 is a front cross-sectional view of FIG. 5.

It is noted that the drawings of the invention are not to scale. The invention will be described with additional specificity and detail through the use of the accompanying drawings. In the drawings like numbering represents like elements between the drawings.

DETAILED DESCRIPTION OF THE PREFERRED EMBODIMENTS

Figure 1:
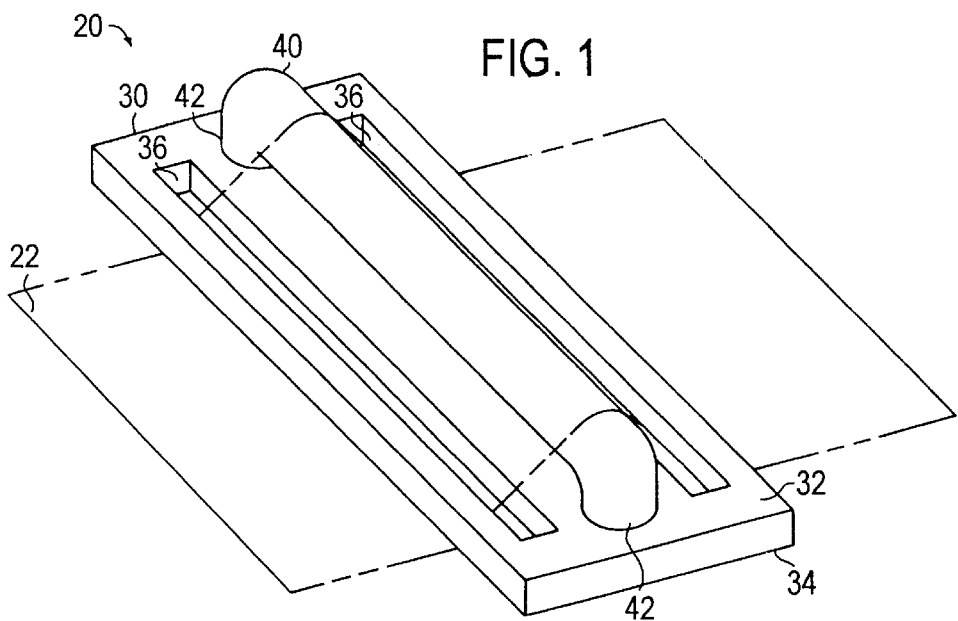
FIG. 1 is a top perspective view of the preferred embodiment of a seat belt tension sensor.
Figure 2:
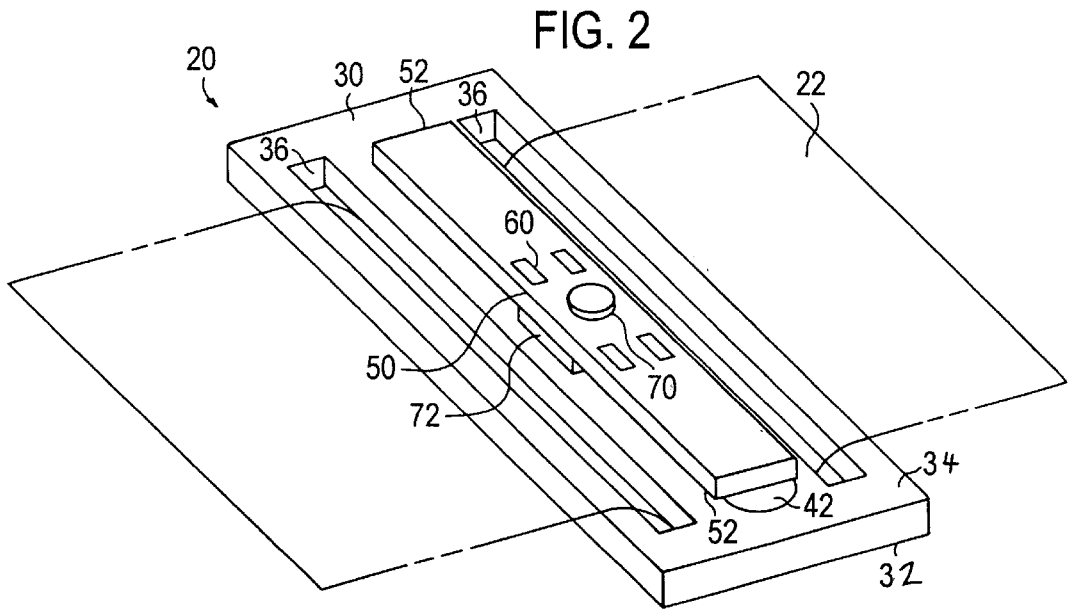
FIG. 2 is a bottom perspective view of FIG. 1.
Figure 3:
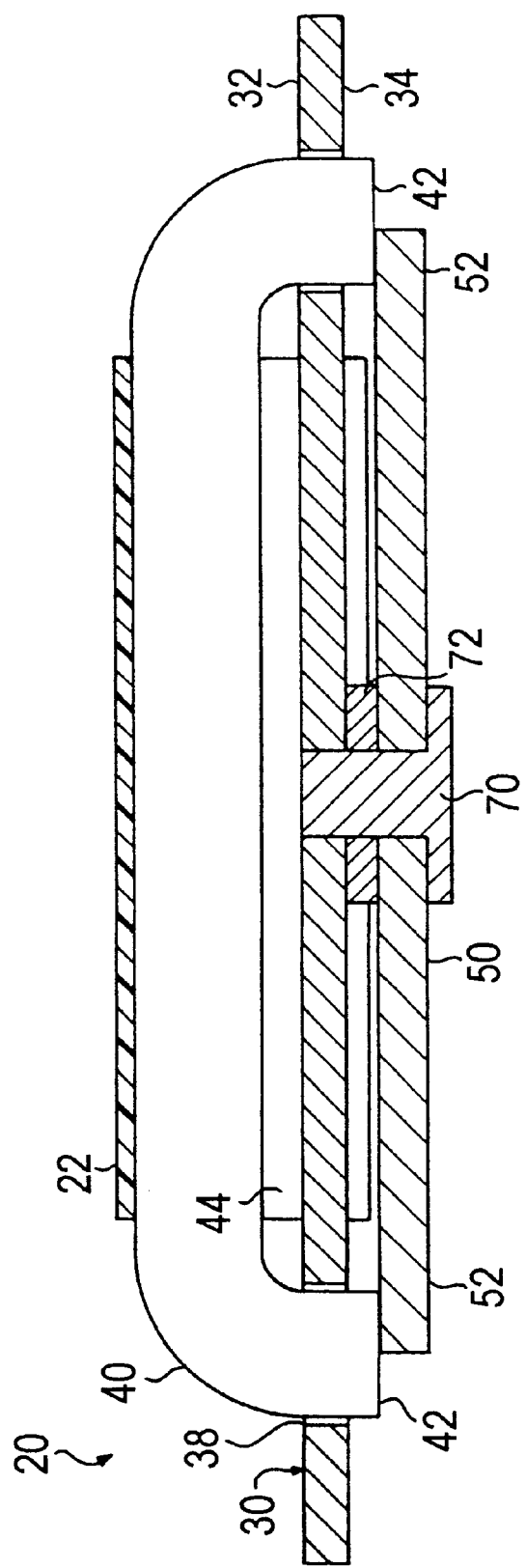
FIG. 3 is a side cross-sectional view of FIG. 1.
Figure 4:
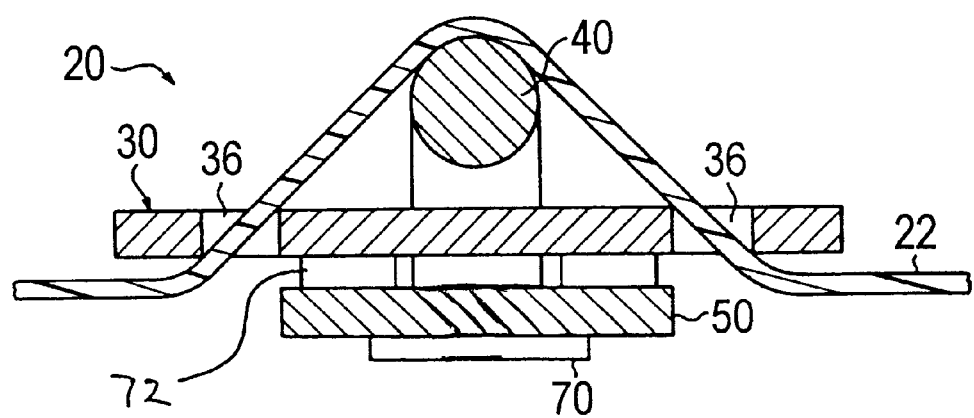
FIG. 4 is a front cross-sectional view of FIG. 1.

The present invention is a seat belt tension sensor. Referring to FIGS. 1–4 a seat belt tension sensor 20 is shown. Sensor 20 has a metal substrate 30. Substrate 30 has A top surface 32, a bottom surface 34, a pair of slots 36 and a pair of apertures 38. Seat belt webbing 22 passes through one of slots 36 over top surface 32, bar 40 and down through the other slot 36. Seat belt webbing 22 is part of a conventional seat belt that has one end attached to the vehicle and the other end attached to a buckle.

A metal actuator bar 40 is located above top surface 32. Bar 40 has a pair of ends 42 that extend downwardly through apertures 38. A gap 44 is formed between bar 40 and substrate 30. A metal load beam 50 is adjacent bottom surface 34. Bar ends 42 contact beam ends 52. A metal screw or rivet 70 attaches load beam 50 to substrate 30. A metal spacer 72 is located between beam 50 and substrate 30. Load beam 50 is preferably formed from 430 stainless steel. Seat belt webbing 22 goes over actuator bar 40.

Several strain gage resistors 60 are located on load beam 50. Details of the construction and operation of resistors 60 are shown U.S. patent application Ser. No. 09/441,350, filed Nov. 15, 1999 and titled, "Automobile Seat Having Seat Supporting Brackets with a Stepped Weight Sensor". Resistors 60 would typically be connected in a conventional bridge configuration. Resistors 60 are strain sensitive and will change resistance based on the amount of strain in load beam 50. A wiring harness (not shown) would typically connect resistors 60 to an external electrical circuit such as an airbag controller.

When an occupant sits in a vehicle seat and buckles a seat belt, the tension placed in the seat belt causes actuator bar 40 to press ends 42 against load beam ends 52. Since the center of load beam 50 is fixed to substrate 30 by post 70, the load beam flexes placing strain on resistors 60. An electrical output signal is generated by the resistors 60 that is proportional to the magnitude of the tension in the seat belt and is transmitted over a wire harness (not shown) to a conventional air bag controller (not shown). The air bag controller then can use the seat belt tension information to compute a more accurate profile of the seat occupant and use that information to control deployment of the airbag.

In a situation where the vehicle is involved in a crash, the seat belt tension sensor 20 operates in a different mode called a high load or crash state. The amount of tension in the seat belt in a crash situation is much larger than in normal operation. If the load beam 50 was designed to carry all of this tension, it would not flex enough to properly function as a strain gage sensor. Therefore, in a crash situation, the actuator bar 40 bottoms out on the substrate 30. The forces are then transferred through the much stronger substrate 30. As the tension in the seat belt increases, the ends 42 flex until they contact substrate 30 providing a positive stop. The sensor is designed so as not to deform under the load placed on it by the seat occupant during a crash situation.

Figure 5:
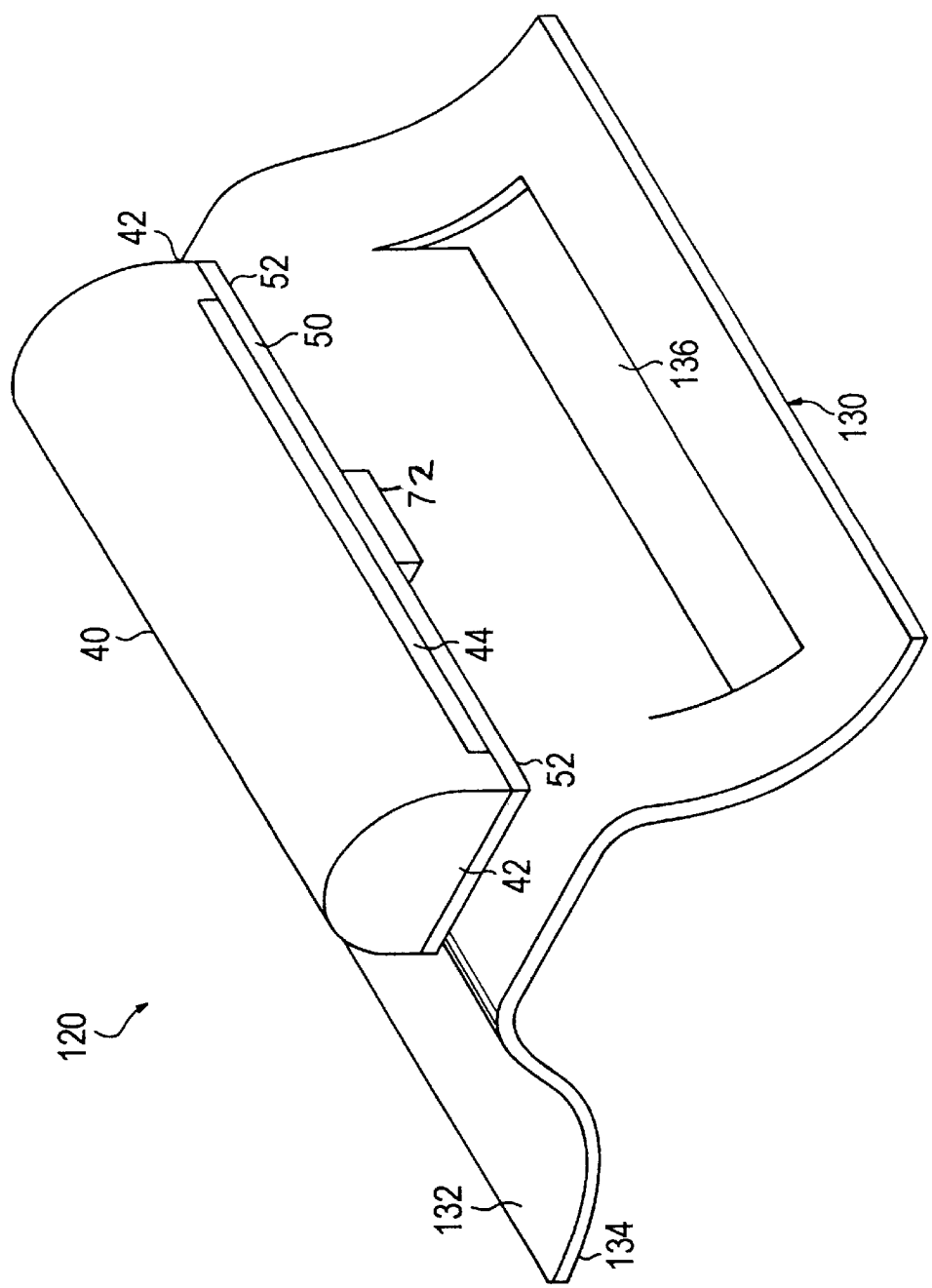
FIG. 5 is a top perspective view of another embodiment of a seat belt tension sensor.
Figure 6:
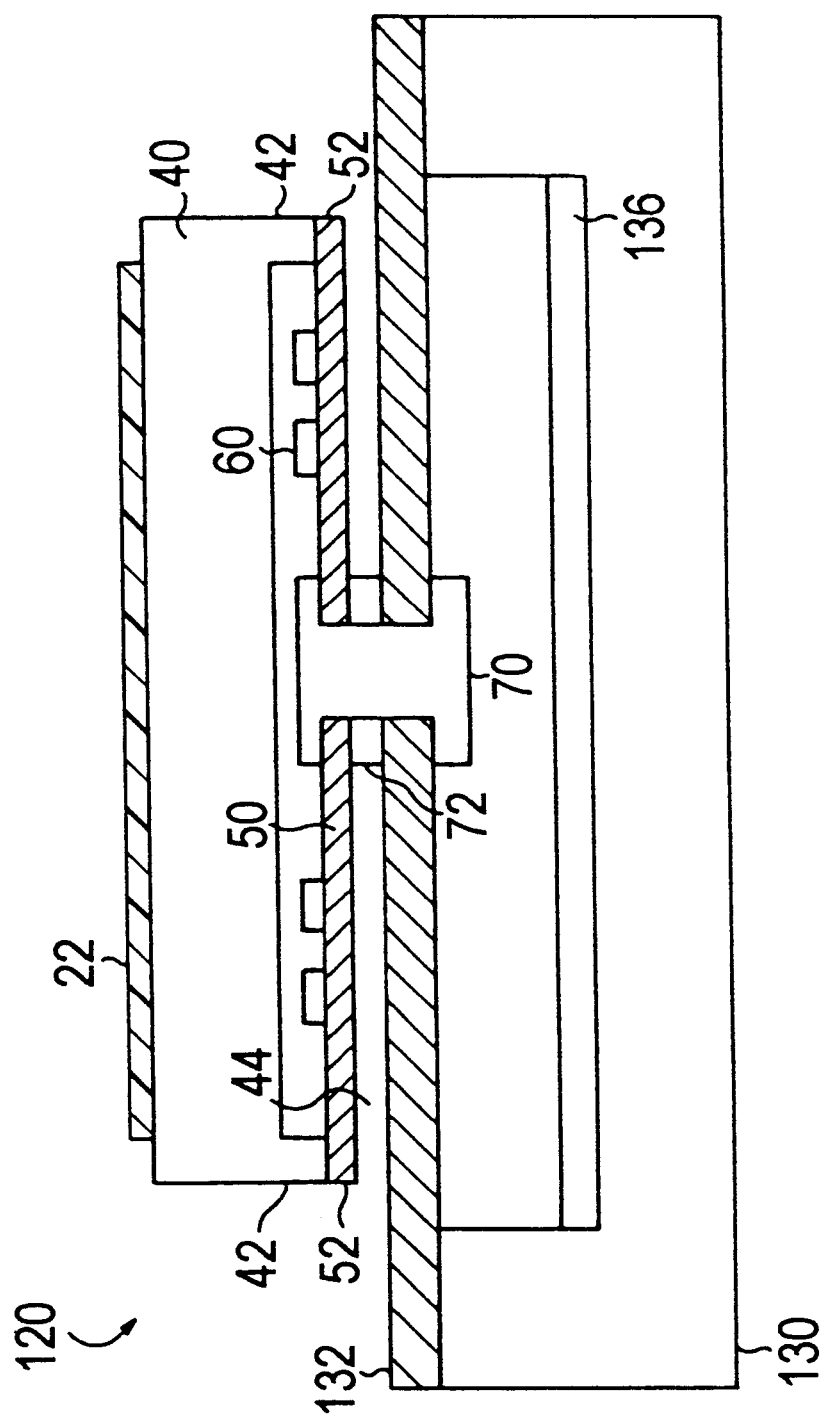
FIG. 6 is a side cross-sectional view of FIG. 5.

Referring to FIGS. 5–7 another embodiment of a seat belt tension sensor 120 is shown. Sensor 120 has a metal substrate 130. Substrate 130 has a top surface 132, a bottom surface 134 and a pair of slots 136. Seat belt webbing 22 passes through one of slots 136 over top surface 132 and down through the other slot 136. Seat belt webbing 22 is part of a conventional seat belt that has one end attached to the vehicle and the other end attached to a buckle.

A metal load beam 50 is spaced from and adjacent top surface 132. Load beam 50 has beam ends 52. A metal screw or rivet 70 attaches load beam 50 to substrate 130. A spacer 72 is located between load beam 50 and substrate 130. Load beam 50 is preferably formed from 430 stainless steel. A metal actuator bar 40 is located above beam 50. Bar 40 has a pair of ends 42 that extend downwardly and contact beam ends 52. A gap 44 is formed between bar 40 and beam 50. Seat belt webbing 22 goes over actuator bar 40.

Several strain gage resistors 60 are located on load beam 50. Details of the construction and operation of resistors 60 are shown U.S. patent application Ser. No. 09/441,350, filed Nov. 15, 1999 and titled, "Automobile Seat Having Seat Supporting Brackets with a Stepped Weight Sensor". Resistors 60 would typically be connected in a conventional bridge configuration. Resistors 60 are strain sensitive and will change resistance based on the amount of strain in load beam 50. A wiring harness (not shown) would typically connect resistors 60 to an external electrical circuit such as an airbag controller.

When an occupant sits in a vehicle seat and buckles a seat belt, the tension placed in the seat belt causes actuator bar 40 to press ends 42 against load beam ends 52. Since the center of load beam 50 is fixed to substrate 130 by post 70, the load beam flexes placing strain on resistors 60. An electrical output signal is generated by the resistors 60 that is proportional to the magnitude of the tension in the seat belt and is transmitted over a wire harness (not shown) to a conventional air bag controller (not shown). The air bag controller then can use the seat belt tension information to compute a more accurate profile of the seat occupant and use that information to control deployment of the airbag.

In a situation where the vehicle is involved in a crash, the seat belt tension sensor 120 operates in a different mode called a high load or crash state. The amount of tension in the seat belt in a crash situation is much larger than in normal operation. If the load beam 50 was designed to carry all of this tension, it would not flex enough to properly function as a strain gage sensor. Therefore, in a crash situation, the load beam 50 bottoms out on the substrate 130. The forces are then transferred through the much stronger substrate 30. As the tension in the seat belt increases, the ends 52 flexes until they contact substrate 130 providing a positive stop. The sensor is designed so as not to deform under the load placed on it by the seat occupant during a crash situation.

Remarks About the Preferred Embodiment

The seat belt tension sensor has several advantages. It allows accurate sensing of seat belt tension. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

Variations of the Preferred Embodiment

The sensor 20 shown was several strain gage resistors, one skilled in the art will realize that the preferred embodiment would work with other types of sensors. For example, discrete chip resistors could be attached to beam 50 or foil type strain gages. Furthermore, the shape of beam 50 could be varied to any configuration that would transfer the weight from the seat belt.

Although sensor assembly 20 was shown without a housing, it is contemplated to add a housing.

Another variation of the seat belt tension sensor would be to utilize other electrical connections other than a wire harness. For example, a connector or terminals could be added.

Yet, a further variation, would be to place signal conditioning circuitry on beam 50 to amplify and filter the electrical signal before it is transmitted to the airbag controller.

The illustrated embodiment showed the use of the seat belt tension sensor in an automobile seat. It is contemplated to utilize the seat belt tension sensor in other occupant sensing applications such as chairs, sofas, scales, beds and mattresses, hospital equipment, cribs, airplane seats, train seats, boat seats, amusement rides, and theater seats.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor for attachment to a seat belt in a vehicle comprising:
   a) a substrate having a top surface, a bottom surface and a pair of slots therethrough, the seat belt passing through the slots, the substrate further having a pair of apertures;
   b) an actuator bar located adjacent the top surface, the actuator bar having a first and second end, the ends passing through the apertures, the seat belt passing over the actuator bar;
   c) a load beam attached to the substrate, the load beam having a first and second end, the ends of the actuator bar contacting the ends of the load beam; and
   d) at least one strain sensitive resistor located on the load beam, the seat belt when placed in tension causes the actuator bar ends to flex the ends of the load beam placing stress on the strain sensitive resistor, the strain sensitive resistor generating an electrical signal in response to being placed under stress, the electrical signal changing as a function of tension on the seat belt.

2. The seat belt tension sensor according to claim 1, wherein the load beam is attached to the substrate by a post.

3. The seat belt tension sensor according to claim 1, wherein a wiring harness is attached to the resistor for connecting the resistor to an external electrical circuit.

4. The seat belt tension sensor according to claim 3, wherein the external circuit is an air bag controller.

5. The seat belt tension sensor according to claim 1, wherein an electrical connector is attached to the load beam.

6. The seat belt tension sensor according to claim 1, wherein four stain sensitive resistors are connected in a wheatstone bridge.

7. The seat belt tension sensor according to claim 1, wherein the ends of the actuator bar contact the substrate in a crash situation so as to limit the forces applied to the load beam.

8. A seat belt tension sensor for attachment to a seat belt in a vehicle comprising:
   a) a substrate having a top surface, a bottom surface and a pair of slots therethrough, the seat belt passing through the slots;
   b) a load beam attached to the substrate adjacent the top surface, the load beam having a first and second end; and
   c) an actuator bar having a first and second end, the ends of the actuator bar contacting the ends of the load beam, the seat belt passing over the actuator bar; and
   d) at least one strain sensitive resistor located on the load beam, the seat belt when placed in tension causes the actuator bar ends to flex the ends of the load beam placing stress on the strain sensitive resistor, the strain sensitive resistor generating an electrical signal in response to being placed under stress, the electrical signal changing as a function of tension on the seat belt.

9. The seat belt tension sensor according to claim 8, wherein the load beam is attached to the substrate by a post.

10. The seat belt tension sensor according to claim 8, wherein the resistor is connected to an airbag controller.

11. The seat belt tension sensor according to claim 8, wherein four stain sensitive resistors are connected in a wheatstone bridge.

12. The seat belt tension sensor according to claim 8, wherein the belt slides through the slots so as to have an adjustable position.

13. The seat belt tension sensor according to claim 8, wherein the ends of the load beam contact the substrate in a crash situation so as to limit the forces applied to the load beam.

* * * * *